US 11,103,734 B2

United States Patent
Foerg

(10) Patent No.: US 11,103,734 B2
(45) Date of Patent: Aug. 31, 2021

(54) FIRE PROTECTION ELEMENT HAVING A CARRIER FABRIC

(71) Applicant: HILTI AKTIENGESELLSCHAFT, Schaan (LI)

(72) Inventor: Christian Foerg, Dillishausen (DE)

(73) Assignee: HILTI ATIENGESELLSCHAFT, Schaan (LI)

( * ) Notice: Subject to any disclaimer, the term of this patent is extended or adjusted under 35 U.S.C. 154(b) by 170 days.

(21) Appl. No.: 16/302,348

(22) PCT Filed: Jun. 12, 2017

(86) PCT No.: PCT/EP2017/064242
§ 371 (c)(1),
(2) Date: Nov. 16, 2018

(87) PCT Pub. No.: WO2018/001706
PCT Pub. Date: Jan. 4, 2018

(65) Prior Publication Data
US 2019/0299037 A1   Oct. 3, 2019

(30) Foreign Application Priority Data
Jun. 28, 2016   (EP) .................................. 16176538

(51) Int. Cl.
*A62C 2/06* (2006.01)
*C09K 21/02* (2006.01)
(Continued)

(52) U.S. Cl.
CPC ................ *A62C 2/065* (2013.01); *B32B 3/06* (2013.01); *B32B 5/02* (2013.01); *B32B 5/024* (2013.01);
(Continued)

(58) Field of Classification Search
CPC .............. A62C 2/065; B32B 2262/101; B32B 2264/108; B32B 2307/3065;
(Continued)

(56) References Cited

U.S. PATENT DOCUMENTS 5,258,216 A * 11/1993 von Bonin ................ B32B 5/30
428/102
6,458,418 B2 * 10/2002 Langer .................. B01D 53/88
427/376.1
(Continued)

FOREIGN PATENT DOCUMENTS

DE   297 22 652 U1   5/1998
DE   202 06 644 U1   10/2003
(Continued)

OTHER PUBLICATIONS https://patentimages.storage.googleapis.com/4f/ac/fb/7d28784398724e/CA2805118A1.pdf (Year: 2012).*
(Continued)

*Primary Examiner* — Arti Singh-Pandey
(74) *Attorney, Agent, or Firm* — Grüneberg and Myers PLLC

(57) ABSTRACT

A fire-protection element includes a carrier material having a carrier fabric; an intumescent material, which is applied to at least one surface of the carrier material and which forms elongated structures when heat is applied. The carrier material has a carrier fabric having loops for receiving the elongate structures of the intumescent material that arise when heat is applied and for hooking together with said elongated structures.

10 Claims, 2 Drawing Sheets

(51) Int. Cl.
*D03D 1/00* (2006.01)
*D03D 27/08* (2006.01)
*D06M 11/74* (2006.01)
*E04B 1/94* (2006.01)
*B32B 5/16* (2006.01)
*B32B 5/22* (2006.01)
*B32B 5/30* (2006.01)
*B32B 5/02* (2006.01)
*D06N 3/00* (2006.01)
*B32B 3/06* (2006.01)
*D03D 15/267* (2021.01)
*D03D 15/513* (2021.01)

(52) U.S. Cl.
CPC .................. *B32B 5/16* (2013.01); *B32B 5/22* (2013.01); *B32B 5/30* (2013.01); *C09K 21/02* (2013.01); *D03D 1/0035* (2013.01); *D03D 15/267* (2021.01); *D03D 15/513* (2021.01); *D03D 27/08* (2013.01); *D06M 11/74* (2013.01); *D06N 3/0063* (2013.01); *E04B 1/947* (2013.01); *E04B 1/948* (2013.01); *B32B 2262/101* (2013.01); *B32B 2264/108* (2013.01); *B32B 2307/3065* (2013.01); *B32B 2419/04* (2013.01); *D06M 2200/30* (2013.01); *D06N 2209/067* (2013.01); *D10B 2101/06* (2013.01); *D10B 2401/04* (2013.01)

(58) Field of Classification Search
CPC ........ B32B 2419/04; B32B 3/06; B32B 5/02; B32B 5/024; B32B 5/16; B32B 5/22; B32B 5/30; C09K 21/02; D03D 15/0011; D03D 15/12; D03D 1/0035; D03D 27/08; D06M 11/74; D06M 2200/30; D06N 2209/067; D06N 3/0063; D10B 2101/06; D10B 2401/04; E04B 1/947; E04B 1/948
See application file for complete search history.

(56) References Cited

U.S. PATENT DOCUMENTS

| | | | |
|---|---|---|---|
| 10,183,465 B1* | 1/2019 | Bowman | B32B 27/32 |
| 2008/0196344 A1 | 8/2008 | Chang et al. | |
| 2012/0207961 A1 | 8/2012 | Drexl et al. | |
| 2013/0118764 A1* | 5/2013 | Porter | H02G 3/22 |
| | | | 169/48 |
| 2013/0214442 A1* | 8/2013 | Naskar | D06M 13/256 |
| | | | 264/29.2 |
| 2013/0255893 A1* | 10/2013 | Stobich | E04B 1/948 |
| | | | 160/268.1 |
| 2015/0218375 A1* | 8/2015 | Hupka | B29C 70/46 |
| | | | 523/400 |
| 2017/0183509 A1* | 6/2017 | Grunlan | B32B 5/02 |
| 2017/0314894 A1* | 11/2017 | Tunis, III | A63B 71/085 |
| 2018/0051180 A1* | 2/2018 | Grunlan | C08K 5/34922 |

FOREIGN PATENT DOCUMENTS

| | | |
|---|---|---|
| DE | 20 2012 001830 U1 | 5/2012 |
| EP | 2 455 135 | 5/2014 |
| WO | 2012/009742 | 1/2012 |
| WO | 2014/116791 | 7/2014 |
| WO | 2015/084739 | 6/2015 |

OTHER PUBLICATIONS https://whatthecraft.com/what-is-the-difference-between-knit-fabrics-and-woven-fabrics/ (Year: 2014).*
International Search Report dated Jul. 4, 2017 in PCT/EP2017/064242.
Written Opinion dated Jul. 4, 2017 in PCT/EP2017/064242.

* cited by examiner

FIRE PROTECTION ELEMENT HAVING A CARRIER FABRIC

CROSS-REFERENCE TO RELATED APPLICATIONS

This application is a National Stage entry under § 371 of International Application No. PCT/EP2017/064242, filed on Jun. 12, 2017, and claims priority to European Patent Application No. 16176538.3, filed on Jun. 28, 2016, the entire contents of which are hereby incorporated by reference.

BACKGROUND OF THE INVENTION

Field of the Invention

The invention relates to a fire-protection element having an intumescent material on a carrier material for sealing against heat and fire in the connecting area of construction elements, especially building components, such as walls, ceilings and floors.

This application is a National Stage entry under § 371 of International Application No. PCT/EP2017/064242, filed on Jun. 12, 2017, and claims priority to European Patent Application No. 16176538.3, filed on Jun. 28, 2016, the entire contents of which are hereby incorporated by reference.

Description of Related Art

For fire partitioning and sealing against heat and fire, intumescent substances are inserted in the connecting area between construction elements, especially between building components such as ceilings, walls and floors. These substances frequently contain a carrier material comprising an incombustible material, on which the intumescent material is applied.

In order to achieve adequate flexibility of such a fire-protection element, frequently a fibrous material, fabric or roving is used as carrier material. However, the problem exists that, in the fire situation, the intumescent material separates from the carrier material due to the effect of temperature. Whereas, in the initial situation, the intumescent material is held on the carrier material by means of an adhesive, such as a polymer or the like, this decomposes at high temperatures, and so, upon a decline of the intumescent effect, which occurs upon the onset of burnup of the carrier material and of the intumescent material, the expanded intumescent material separates from the carrier material.

This effect is frequently counteracted by mechanical devices, which in the fire situation hold the expanded intumescent material at the desired position.

From publication WO 2015/084739 A1, reinforcement of the intumescent material by a fabric mesh is known.

From publication EP 2 455 135 A2, a fire-protection element with a foamed body is known, which consists at least partly of an ash-forming and possibly intumescent substance mixture and at least one prefabricated thin and flat carrier component, which is bonded with at least one flat side to the foamed body. In particular, the carrier component may be a fabric or roving.

In the foregoing prior art, the carrier material serves merely as reinforcement, but due to the open mesh structure has only limited ability to guide the intumescence.

In publication DE 20 2012 001830 U1, an intumescent compound containing a glass-fiber mat or glass-fiber fabric is known that has a mesh width of at least 0.01 cm. Furthermore, the glass-fiber mat or the glass-fiber fabric may be disposed in such a way that, under the effect of heat and accompanied by formation of a carbon foam, it is able to form a bond between intumescent compound and carbon foam. Nevertheless, it cannot be expected that, after complete conversion, i.e. at the beginning of burnup, or of shrinkage, the glass-fiber layer and the intumescent layer will still adhere to one another.

From publication WO 2014/116791 A1, a fabric with a coating is known, wherein the coating contains a binder and an expandable graphite material and is applied on the fabric.

Publication DE 202 06 644 U1 discloses a fire-protection element for introduction into an open cross section of a hollow profile, wherein a fire-protection mass with mesh-like and flexible structure is bonded to the fire-protection element and is trapped by the fire-protection element.

Publication DE 297 22 652 U1 discloses a fire-protection mat comprising a wide-mesh glass-fiber fabric as carrier material and comprising a coating of a fire-protection compound that is applied on the glass-fiber fabric and that foams up to form a porous separating layer under the effect of fire.

The two last-mentioned publications respectively disclose a mesh that is equipped with an intumescent material, wherein the mesh represents merely a kind of reinforcement, by which the force of the intumescent action can be guided to only a limited extent in one direction.

BRIEF SUMMARY OF THE INVENTION

It is the object of the present invention to provide an improved fire-protection element with an intumescent material applied on a carrier material, wherein an intumescent action occurring under the effect of fire is guided and wherein, during subsequent burnup of the intumescent material, this remains trapped by the carrier material.

This object is solved by the fire-protection element according to the embodiments disclosed herein.

Further configurations are specified in the dependent claims.

According to one aspect, a fire-protection element is provided comprising:
a carrier material with a carrier fabric;
an intumescent material that is applied on at least one surface of the carrier material and forms elongated structures under the effect of heat;
wherein the carrier material is provided with a carrier fabric having loops, in order to receive the elongated structures of the intumescent material formed under the effect of heat and to hook together therewith.

One idea of the foregoing fire-protection element consists in applying intumescent material onto a carrier material, which is designed as fabric material with loops, in which expandable-graphite structures formed by the effect of heat on the intumescent material can engage and hook. The expandable-graphite structures are elongated wormlike, usually slightly curved elongated structures, which are formed from graphite flakes in the intumescent material under the effect of heat. By adaptation of the intumescent material being used to the loop size of the fabric material, penetration of free ends of the expandable graphite structures into the loops of the fabric becomes possible, and so an improved bond is achieved between the fabric material and the expanded intumescent material.

The bond between the fabric material and the expanded intumescent material also has high resistance to a hosestream test, which is an important aspect in the assessment of the fire-protection fitness of construction substances.

Furthermore, the intumescent material may contain graphite in a form that produces elongated expandable-graphite structures under the effect of heat.

It may be provided that the carrier fabric of the carrier material is designed as a terry-loop fabric.

According to one embodiment, the loops may have an average cross-sectional area, such that the elongated structures of the intumescent material are able to engage in the loops.

In particular, the loops may have an average cross-sectional area that is 1.5 times larger, preferably 3 times larger than the average cross-sectional area of the elongated structures.

Furthermore, the carrier material may be equipped with a reinforcing layer, especially on a surface not covered with the intumescent material.

According to one embodiment, the carrier layer may be equipped with a fastening layer, especially an adhesive layer.

BRIEF DESCRIPTION OF THE DRAWINGS

Embodiments will be explained in more detail hereinafter on the basis of the attached drawings, wherein.

DETAILED DESCRIPTION OF THE INVENTION

Figure 1:
FIG. 1 shows a schematic diagram of a fire-protection element according to one embodiment.

FIG. 1 shows a schematic diagram of fire-protection element 1 according to one embodiment of the present invention. Fire-protection element 1 has a substantially flat carrier material 2, on which a layer of intumescent material 3 is applied. Carrier material 2 is formed with a carrier fabric of fabric material and, at least on the surface turned toward the intumescent material, has loops with large cross section.

Figure 2A:
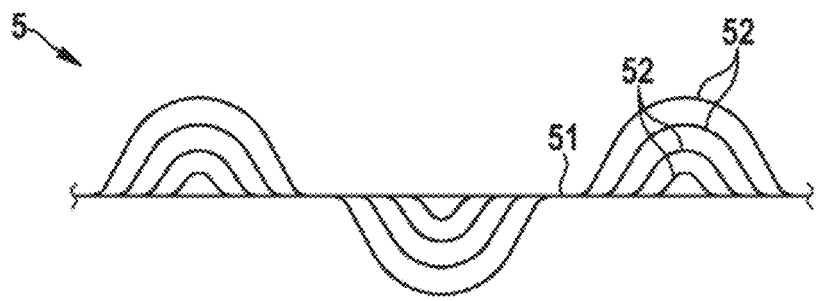
FIG. 2a shows a schematic diagram of a yarn of glass-fiber fabric with loops.
Figure 2B:
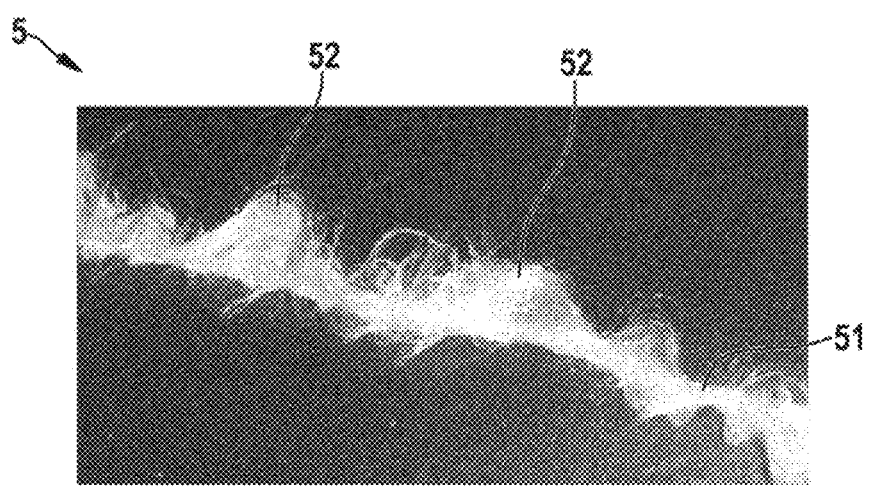
FIG. 2b shows an enlarged photographic picture of a yarn of glass-fiber fabric with loops.

The carrier fabric is preferably formed from a fire-resistant material, such as from glass-fiber material, for example. The carrier fabric of glass-fiber material is manufactured by means of a glass-fiber yarn that has a series of loose loops, as is shown schematically in FIG. 2a, for example, and in a photographic picture in FIG. 2b. This glass yarn 5 has a bundle of one or more base filaments 51 and a large number of loop filaments 52, which loosely surround the base-filament bundle and thus form loops of various cross sections.

From such a glass-fiber yarn 5, it is now possible to form a glass-fiber fabric as the carrier fabric, which substantially has a structure as is known from terry-loop fabric, which is known in itself. Possible fabrics that may be used as carrier fabric 2 are, for example, THS Loomstate, E-Glass Glove with a weight per unit area of 430 g/m2 as well as HKO Thermo-E-Glasgewebe PG410 Frottee.

Figure 3:
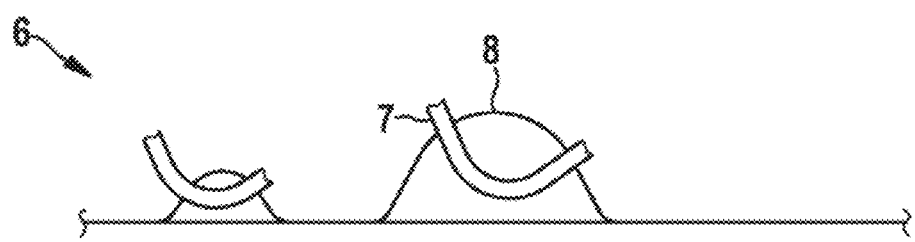
FIG. 3 shows a schematic diagram of the mode of action of improved adhesion between the carrier material and the intumescent material in the fire situation.

FIG. 3 illustrates a detail of fire-protection element 1, which schematically represents a boundary face 6 between intumescent material 3 and carrier material 2 after the action of heat. The expanded intumescent material has expandable-graphite structures 7, which stretch out in wormlike elongated manner and have been formed under the effect of heat from graphite flakes common for intumescent materials. The carrier material has loops 8 at its surface. At the boundary face 6 between intumescent material 3 and carrier material 2, the formed expandable-graphite structures 7 are able to extend into the loops of carrier material 2 and become hooked there. The expandable-graphite structures 7 of the expanded intumescent material 3 also engage with one another, and so both a cohesive intumescent material 3 and improved adhesion of the expanded intumescent material 3 in the loops of the carrier material 2 are achieved.

In contrast to conventional fire-protection elements of this type, this effect is also preserved at the beginning of burnup of the intumescent material 3, and so falling-off of the resulting ash crust is reduced or completely suppressed.

The size and geometry of the graphite flakes for intumescent material 3 are chosen such that the average cross-sectional area of loops 8 of the carrier fabric of carrier material 2 is larger than the average cross-sectional area of the elongated expandable-graphite structures 7, and so these can be hooked in sufficiently high proportion into loops 8. As an example, this is achieved by the fact that the average cross-sectional area of loops 8 is larger than the cross-sectional area of expandable-graphite structures 7 being formed, preferably at least larger than 1.5 times the cross-sectional area of expandable-graphite structures 7 being formed.

Figure 4:
FIG. 4 shows a schematic diagram of a further fire-protection element according to a further embodiment.

As illustrated in FIG. 4, the carrier material may be equipped with a reinforcing layer 9 on a surface turned away from intumescent material 3, in order to achieve improved stability of fire-protection element 1 and in the fire situation to achieve a guided intumescent action in the direction of the side turned toward the intumescent material 3. Alternatively or additionally, a fastening layer 10 in the form of an adhesive layer or the like may also be formed on the surface of carrier material 2 turned away from intumescent material 3.

In the mounted condition, carrier material 2 may also function as a housing, in order to achieve, in the fire situation, a guided intumescent action in the direction of the interior of the housing. Thereby, when the fire-protection element is disposed around a pipe, for example, or the like, the intumescent action can be guided in the direction of the pipe.

LIST OF REFERENCE SYMBOLS

1 Fire-protection element
2 Carrier material
3 Intumescent material
5 Glass-fiber yarn
51 Base filament
52 Loop filament
6 Boundary surface
7 Expandable-graphite structures
8 Loops
9 Reinforcing layer
10 Fastening layer

The invention claimed is:

1. A fire-protection element, comprising:
a fabric comprising fire-resistant glass yarns, the fire-resistant glass yarns comprising filaments having a high surface area in the form of one or more fibrils or one or more loops protruding from at least one base filament; and an intumescent material comprising graphite flakes, the intumescent material being applied to at least one surface of the fabric, wherein under the effect of heat the intumescent material forms elongated structures that are wormlike and slightly curved to hook into the one or more loops of the fabric to increase adherence of the intumescent material to the fabric, wherein the one or more loops of the fabric have an average cross-sectional area that is 1.5 times larger than an average cross-sectional area of the elongated structures, which allows the elongated structures of the intumescent material to hook into the one or more loops.

2. The fire-protection element according to claim 1, wherein the one or more loops filaments protrude from at least one base filament of the fabric in a direction of the intumescent material.

3. The fire-protection element according to claim 1, further comprising a reinforcing layer coupled to the fabric.

4. The fire-protection element according to claim 1, further comprising a fastening layer coupled to the fabric.

5. A protective structure for a building feature, comprising:

a fabric comprising fire-resistant glass yarns, the fire-resistant glass yarns comprising filaments having a high surface area in the form of one or more fibrils or one or more loops extending from a base filament; and an intumescent material comprising graphite flakes, the intumescent material being applied to at least one surface of the fabric, wherein under the effect of heat the intumescent material forms elongated structures that are wormlike and slightly curved to hook into the one or more loops of the fabric to hold the intumescent material on the fabric without aid of an adhesive, wherein the one or more loops of the fabric have an average cross-sectional area that is 1.5 times larger than an average cross-sectional area of the elongated structures, which allows the elongated structures of the intumescent material to hook into the one or more loops, wherein engagement between the elongated structures and the one or more loops of the fabric guides expansion of the intumescent material in one or more directions.

6. The protective structure according to claim 5, wherein:
the elongated structures have free ends, and
the free ends move to hook with the one or more loops when heat is applied to the intumescent material.

7. The protective structure according to claim 5, wherein the fabric and the intumescent material are flexible to conform for coupling to an outer shape of the building feature.

8. The protective structure according to claim 7, wherein the building feature is a pipe or cable.

9. The protective structure according to claim 5, wherein the one or more directions include a direction in which the building feature extends.

10. The protective structure according to claim 5, wherein the filaments have a flexible shape which curves.

* * * * *

UNITED STATES PATENT AND TRADEMARK OFFICE
CERTIFICATE OF CORRECTION

PATENT NO. : 11,103,734 B2  
APPLICATION NO. : 16/302348  
DATED : August 31, 2021  
INVENTOR(S) : Christian Foerg It is certified that error appears in the above-identified patent and that said Letters Patent is hereby corrected as shown below:

On the Title Page

Item (71), the Applicant's name currently reads:  
"HILTI ATIENGESELLSCHAFT"  
And should be:  
-- HILTI AKTIENGESELLSCHAFT --

Signed and Sealed this  
Ninth Day of November, 2021

Drew Hirshfeld  
*Performing the Functions and Duties of the*  
*Under Secretary of Commerce for Intellectual Property and*  
*Director of the United States Patent and Trademark Office*